No. 675,559. Patented June 4, 1901.
J. P. B. FISKE.
APPARATUS FOR USE IN THE MANUFACTURE OF BRICKS.
(Application filed Sept. 22, 1899.)
(No Model.) 3 Sheets—Sheet 2.
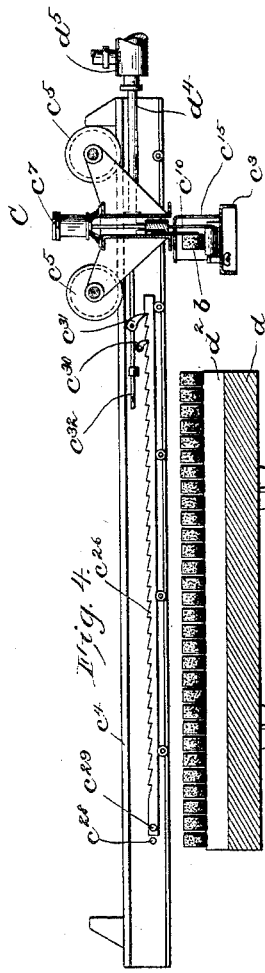
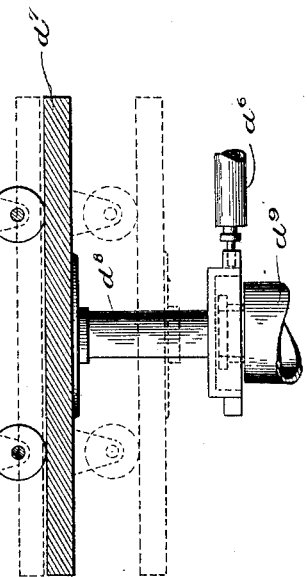
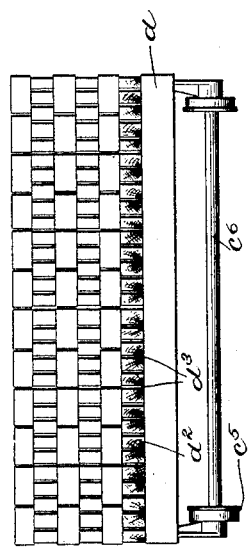

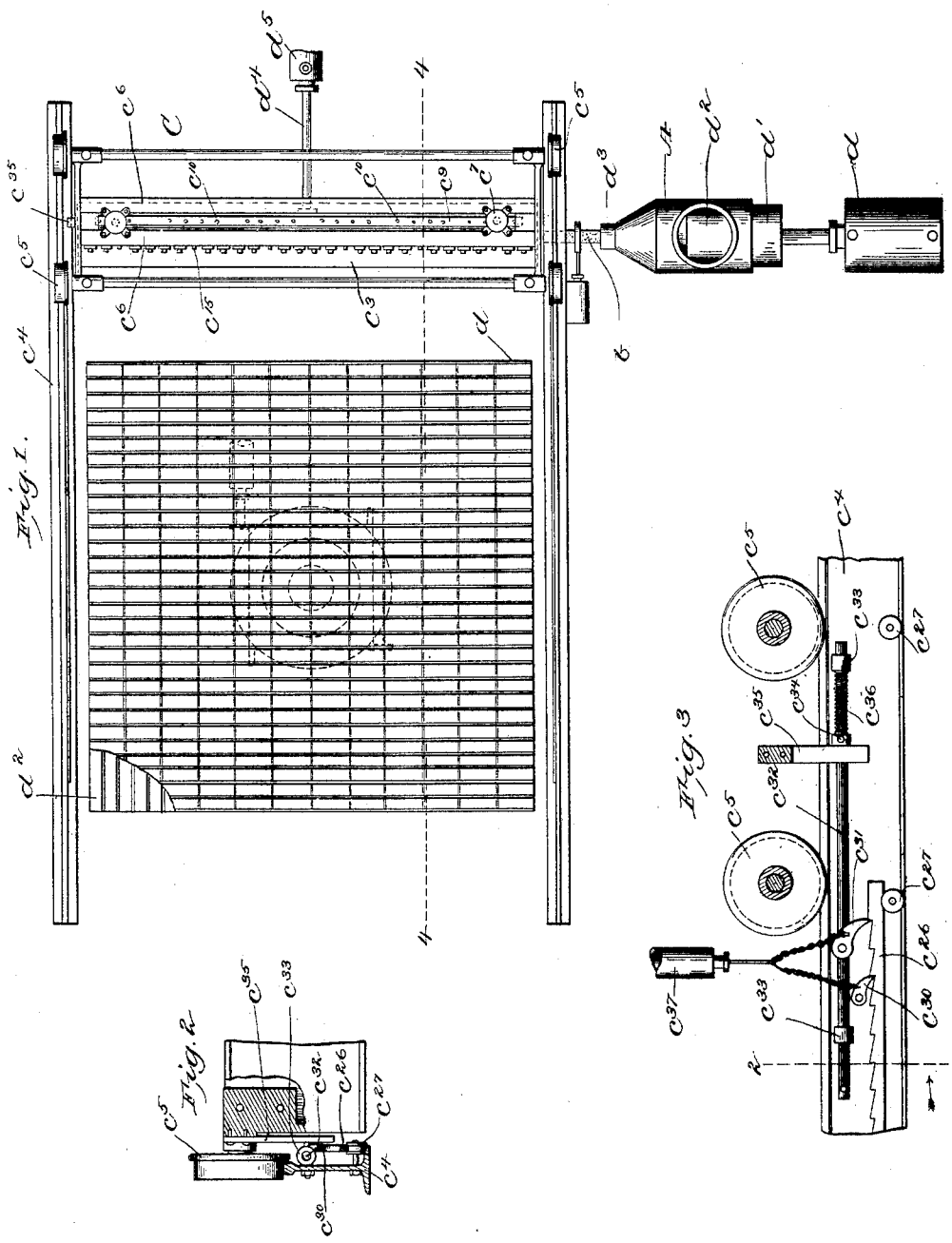

No. 675,559. Patented June 4, 1901.
J. P. B. FISKE.
APPARATUS FOR USE IN THE MANUFACTURE OF BRICKS.
(Application filed Sept. 22, 1899.)
(No Model.) 3 Sheets—Sheet 3.
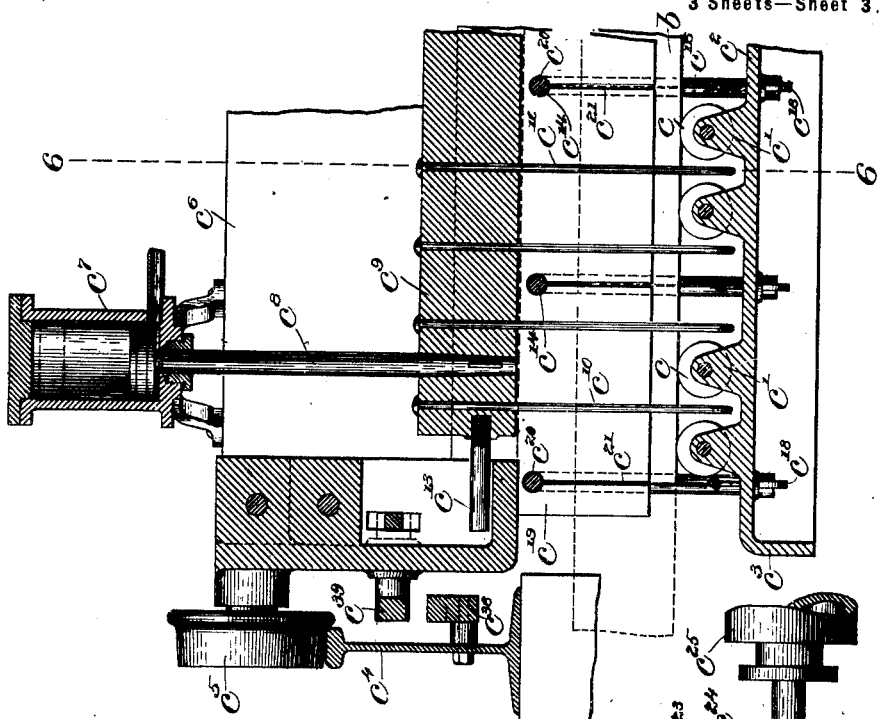
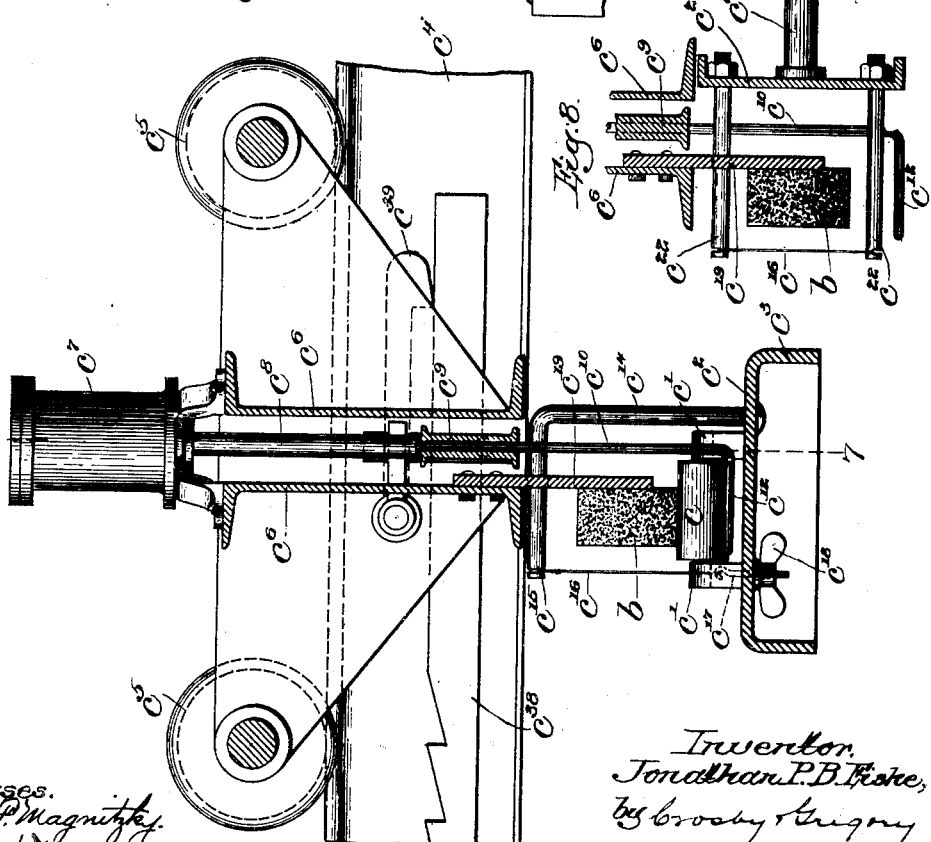
Witnesses.
Gustave P. Magnitzky.
Thomas J. Drummond.
Inventor.
Jonathan P. B. Fiske,
by Crosby & Gregory
Attys.

UNITED STATES PATENT OFFICE.

JONATHAN P. B. FISKE, OF NEWTON, MASSACHUSETTS.

APPARATUS FOR USE IN THE MANUFACTURE OF BRICKS.

SPECIFICATION forming part of Letters Patent No. 675,559, dated June 4, 1901.

Application filed September 22, 1899. Serial No. 731,267. (No model.)

*To all whom it may concern:*

Be it known that I, JONATHAN P. B. FISKE, of Newton, county of Middlesex, and State of Massachusetts, have invented an Improvement in Apparatus for Use in the Manufacture of Bricks, of which the following description, in connection with the accompanying drawings, is a specification, like letters on the drawings representing like parts.

As more fully stated in my Patent No. 633,955, dated September 26, 1899, it is extremely advantageous, both on account of the economy and rapidity of manufacture and also because of the superior quality and uniform grade of bricks turned out, that the bricks should be handled as little as possible before they become a finished product. In my aforesaid patent I have disclosed means for handling bricks, which, generally stated, is for taking the green bricks after they have been built into what are termed "unit stacks" and thereafter handling the same intact without disturbance of the stack formation. This implies, however, that the bricks will be stacked by hand at the brick-making machine, and accordingly in this application I have set forth an invention enabling the bricks to be formed and stacked without any manual handling whatever, so that by means of the apparatus disclosed in my aforesaid patent and the present application all manual handling of the bricks is dispensed with entirely.

In carrying out my invention I provide means for automatically receiving and cutting up the bars of green clay into individual bricks and then carrying them to a car or stacking-station in such manner as to deposit them thereon in proper stack formation, substantially as explained in my before-mentioned patent, the green bricks then being preferably carried by said car directly into a drying-kiln, or, if preferred, they may of course be carried from said station and deposited in said kiln through an opening in its top, such as is shown in my aforesaid patent, and then after having been properly dried they may be carried bodily into a burning-kiln, as set forth in my said patent.

The details of construction and various other advantages of my invention will be more particularly pointed out in the following description, reference being had to the accompanying drawings, illustrative of a preferred embodiment of my invention, and the latter will be more particularly defined in the appended claims.

In the drawings, Figure 1 represents in top plan a general view of a sufficient portion of the apparatus to render my invention fully understood, the middle part thereof being broken away. Fig. 2 is a section taken on the line 2 2, Fig. 3. Fig. 3 is a fragmentary view, in side elevation, of one of the carrying-rails and the automatic spacing mechanism, said view also showing in section a sufficient portion of the crane to enable the operation to be understood. Fig. 4 is a vertical longitudinal section taken on the line 4 4, Fig. 1, similarly broken out. Fig. 5 is an end elevation of one of the cars used in connection with the other apparatus, said view showing the car loaded with green bricks. Fig. 6 is a vertical transverse section on the line 6 6, Fig. 7. Fig. 7 is a similar cross-section on the line 7 7, Fig. 6; and Fig. 8 represents a slight modification, to be explained.

It will be understood that while I have indicated in the drawings a typical plant and its arrangement, yet I do not in any wise limit myself thereto, inasmuch as my invention is capable of adaptation to any kind of brick-making plant, and by the term "brick-making" I of course intend to include the manufacture of all kinds of clay products.

Viewing Figs. 1 and 4, I have indicated a brick-making machine A, herein shown as of the plunger type, operated, preferably, by a hydraulic cylinder $a$ and plunger $a'$, the clay being fed into the machine through an opening $a^2$ and formed into a bar by being ejected through a die or mouth $a^3$, the bar $b$ of clay being the same size in cross-section as a brick, as clearly shown in Fig. 6. The bar $b$ is received by a proper receiving table or support comprising a plurality of raised receiving members or elevations with intervening spaces, said members being herein shown as a plurality of antifriction-rollers $c$, properly mounted in bearings $c'$, extending upwardly from a base plate or bed $c^2$, whose flanges $c^3$ are supported in any convenient manner. The bar of clay is carried by the bed $c^2$ and rollers $c$ in order that a considerable length thereof may be treated at once, it being preferable that the clay bar $b$ shall correspond in length to the width of the transporting-car $d$, which I prefer to employ for receiving the bricks to be carried thereby into a drier or other kiln.

Above the bed $c^2$, provided for the bar of clay $b$ and extending at either side of the receiving position of the car $d$, are rails $c^4$ of an overhead crane C. (Shown in enlarged detail in Figs. 6 and 7.) This crane or transporting or conveying device may be in general of any approved pattern, preferably comprising two or more end traction-wheels $c^5$ for running on the rails $c^4$, journaled in a proper frame or carriage $c^6$, and mounted on this frame are lifting devices $c^7$, herein shown as hydraulic, whose stems or rods $c^8$ are secured at their lower ends to the opposite ends of a rigid beam $c^9$, shown as made of heavy channel-iron, in which are secured depending teeth $c^{10}$, extending forward horizontally at their lower ends $c^{12}$ and spaced apart in such manner as to provide two or more teeth for each brick. The beam $c^9$ preferably has a guide or guide-pin $c^{13}$ running in a vertical slot at each end of the frame to guide it uniformly in its up-and-down travel as it is raised or lowered by the hydraulic lifts $c^7$, said teeth or engaging means $c^{10}$ occupying a position at their lower ends beneath the receiving plane of the rollers $c$ when the lifting-beam $c^9$ is in its lowermost position, but serving to engage and lift the clay bar entirely free from said receiving-rollers when in their raised position.

It is important that no twisting, swaying, or irregularity of movement shall be possible in the case of the carrying-hooks, as otherwise the bricks would become displaced relatively to each other and relatively to the previously-arranged bricks, and also the carrying hooks or fingers would fail to register with the spaces of the platform or of the previously-arranged bricks, as subsequently explained. The pins $c^{13}$ also act as trips for the pawls $c^{39}$, as subsequently explained.

Extending upwardly from the rear side of the bed $c^2$ are angle-irons or forwardly-bent arms $c^{14}$, which carry at their forward ends $c^{15}$ cutting-wires $c^{16}$, said wires being preferably secured at their lower ends by threaded hooks $c^{17}$, capable of tightening adjustment by wing-nuts $c^{18}$, as clearly shown in Figs. 6 and 7.

Behind the cutting-wires $c^{16}$ and immediately at the rear of the clay bar after it has been delivered along the rollers $c$ by the brick-making machine A is a back-support or pressure-plate $c^{19}$, secured to the crane-carriage $c^6$, said plate being provided with apertures $c^{20}$ and slits $c^{21}$ for clearing the cutting apparatus $c^{15}$ $c^{16}$. When, therefore, a bar of clay has been ejected from the brick-making machine lengthwise of the receiving-bed, the operator lets pressure into the cylinders of the lifts $c^7$, thereby raising the lifting devices $c^{10}$ into engagement with the bar of clay, so as to remove it out of contact with the supporting-rollers $c$, and then the crane is moved forward, thereby causing the clay bar to be cut transversely by the several wires $c^{16}$ into as many individual bricks, a clean cut being insured by the pressure-plate $c^{19}$, which not only prevents any tipping or irregular cutting of the clay, but also insures that the bar shall not be disturbed in any way in its position on the supporting-fingers or carrying devices $c^{10}$, or, if desired, the wire $c^{16}$ instead of being mounted fixedly on the base $c^2$ may be carried by arms $c^{22}$, projecting forward from a beam $c^{23}$, carried at the free ends of rams $c^{24}$, operated hydraulically from cylinders $c^{25}$, immediately at the rear of the hooks $c^{10}$, as shown in Fig. 8, the cutting in this case taking place prior to the forward movement of the clay bar, or, if desired, prior to the engagement of the ends $c^{12}$ of the lifting-hooks $c^{10}$ with the bars, the pressure-plate $c^{19}$ holding the bar rigidly in place for cutting the same, as before.

In order that the ends $c^{12}$ of the lifting-hooks or carrying-fingers $c^{10}$ may readily be removed from beneath the bricks after the latter have been properly placed on the car $d$, I provide the car with a plurality of projections $d^2$, or, in other words, I provide the car with a series of grooves $d^3$, these grooves being in alinement with the lifting hooks or devices $c^{10}$, so that when the latter have been brought by the crane with their load of bricks over the place on the car where the bricks are to be deposited and lowered into position the bricks will be supported by the projections $d^2$, permitting the hooks to descend slightly into the groove $d^3$, out of contact with the bricks, in substantially the same position relating to the bricks as shown in Figs. 6 and 7, whereupon the crane is moved back over the bed $c^2$, and when loaded with another row or series of bricks it is again pushed forward by suitable means, preferably hydraulic, as indicated at $d^5$, so as to deposit the next row of bricks adjacent the first row of bricks, leaving a space between the same similar to the grooves $d^3$, and this process is repeated until the first layer of bricks is deposited on the car. The car is then given a quarter-turn by means of a hydraulic ram or other device $d^6$ in order to place the next layer of bricks upon the preceding layer, so that the pile of bricks may be built up in regular stack formation proper for the drying-kiln and the burning-kiln.

For convenience I have indicated in Fig. 5 five layers of bricks made up of rows of twelve bricks each; but I do not limit my carrying mechanism in this respect, as it is capable of carrying any number and arrangement of bricks. In order, however, to get the successive layers of bricks on the car at the proper heights, it is necessary that either the carrying devices should be raised or the cars should be lowered, and inasmuch as there is great inconvenience and would be considerable expense in building the carrying devices in such a manner as to permit the lifting to proper successive heights of the carrying-hooks and their load I prefer to make the car adjustable up and down, and for this purpose have mounted it on a platform $d^7$, carried by a hydraulic lift $d^8$, operated by suitable hydraulic mechanism $d^9$, so that as one layer of bricks is laid on the car the lift will be lowered the thickness of said layer, and the platform $d^7$ and car $d$ will be then given a quarter-turn by the ram $d^6$ and the next layer of bricks put in position, whereupon the car will be given another quarter-turn or brought back to its original angular position and lowered the thickness of the second layer of bricks, and then a third layer will be placed, and so on until the car is entirely loaded.

In order that the entire operation may be as nearly automatic as possible, I have provided an automatic step-by-step mechanism for stopping the crane at successively shorter and shorter distances from the brick making or forming mechanism as it deposits the successive series of bricks, the result being that the latter are spaced on the car precisely as they should be without any danger of irregularity or improper spacing. For this purpose I mount upon one or both of the rails $c^4$ a ratchet-bar $c^{26}$, movably carried on rollers $c^{27}$, said bar being limited in its movement at one end by a stop $c^{28}$, and itself carrying adjacent said end a stop $c^{29}$, and engaged at its opposite end by a pawl $c^{30}$, pivoted on the rail $c^4$, and also by a pawl $c^{31}$, pivoted on a rod $c^{32}$, sliding in lugs $c^{33}$, projecting from the rail $c^4$, said rod $c^{32}$ having a pin $c^{34}$, adapted to be engaged by a leg or bar $c^{35}$ on the car or transporting device, and provided with a spring $c^{36}$, operating between the pin $c^{34}$ and one of the lugs $c^{33}$, suitable means—as, for instance, a hydraulic cylinder and piston $c^{37}$—being provided for raising the pawls $c^{30}$ $c^{31}$ for the purpose of allowing the ratchet-bar $c^{26}$ to be restored to its original position by the movement of the crane when it is desired to begin placing a fresh layer of bricks on the car. The operation of this step-by-step mechanism is as follows: When the crane moves ahead with its load, it is stopped by coming in contact with the stop $c^{29}$, carried by the ratchet-bar, and when it returns empty it strikes the pin $c^{34}$, thereby compressing the spring $c^{36}$ to the distance of one notch of the ratchet $c^{26}$, causing the pawl $c^{31}$ to move the ratchet-bar $c^{26}$, with the stop $c^{29}$, ahead one notch, in which position the ratchet-bar is held by the pawl $c^{30}$, and this operation is repeated at every reciprocation of the crane until the entire layer or series of rows of bricks is placed on the platform.

In Figs. 6 and 7 I have simply indicated the stationary ratchet-bar $c^{38}$ to be engaged by a pawl $c^{39}$, said pawl being operated, preferably, by the pin $c^{13}$ by the raising and lowering of the carrying hooks or fingers, this device being advantageous for securing accuracy of spacing of the rows of bricks, although not so automatic as the more complete device just explained.

The operation of my invention, stated briefly, is as follows: The bricks, resting on the receiving members or elevations of the supporting-bed in the position as they are left by the forming mechanism, (which, as herein exhibited, consists of the brick-machine for ejecting the clay upon the table and the cutting-wire coöperating therewith in severing the bricks,) are engaged by the carrying-hooks of the transporting mechanism, which enter the spaces between said receiving members, thereby engaging each brick, and are lifted by said transporting mechanism and carried thereby to be stacked, the stacking mechanism (which comprises the step-by-step apparatus and the hydraulically-operated receiving means or car, as herein shown) coöperating with the transporting mechanism in placing the bricks in regular stack formation in successive rows of bricks and successive layers at right angles to each other, all these operations being effected automatically without manual handling of the bricks and without abrading or injury from the moment they leave the brick-making machine to their final lodgment in stack formation ready to be carried by the car into the drying-kiln and burning-kiln.

The cars, as herein shown, will preferably be about ten feet square, capable of receiving a column or row of about sixteen bricks; but I have herein shown an apparatus of much smaller capacity in order that the details thereof might be presented on a larger scale in the drawings.

It will be understood that all the hydraulic apparatus will be controlled by a set of levers at one operating-platform, so that one man can operate the entire apparatus, and inasmuch as the apparatus is practically automatic the bricks may be handled with extreme rapidity, limited only by the capacity of the brick-making machine.

I have already stated that I do not intend to limit myself herein to the details shown and described, inasmuch as my invention is broadly new in several respects, and various modifications, substitutions, and other changes may be resorted to within the spirit and scope of the claims, as hereinafter set forth.

Having described my invention, what I claim as new, and desire to secure by Letters Patent, is—

1. An automatic forming, transporting and stacking apparatus for green bricks, comprising mechanism for forming a series of green bricks, transporting mechanism constructed and arranged to engage and positively lift a series of said formed bricks as they are formed at said forming mechanism, and transport them from the forming mechanism to a stacking-point, and stacking mechanism to coöperate with the transporting mechanism to effect the deposition of successively-transported series in regular stack formation requisite for drying or burning, the bricks of each series being retained throughout the operation of the apparatus in the relative position and arrangement as they are left by the forming mechanism, substantially as described.

2. An apparatus of the kind described, in which the clay is formed into green bricks which are conveyed and stacked, all without manual handling, or abrasion or injury of the bricks, said apparatus comprising mechanism for forming a series of the bricks, transporting mechanism arranged adjacent thereto and coöperating therewith, said transporting mechanism engaging the bricks of the series, as they rest on the forming mechanism, without abrasive or tumbling movement and carrying the bricks without disturbance of their relative positions to the desired place, and stacking mechanism at the latter place coöperating with the transporting mechanism for causing the successively-transported series of bricks to be deposited in regular stack formation required for drying or burning, substantially as described.

3. In an apparatus for the manufacture of bricks, brick-making mechanism for forming a plurality of bricks, lifting mechanism and coöperating receiving means for taking said bricks from said forming mechanism and placing them in successive layers, respectively at right angles to each other, substantially as described.

4. In an apparatus for the manufacture of bricks, means for forming successive rows of bricks, and lifting mechanism for raising and transporting said rows of bricks successively, and depositing them adjacent each other, said mechanism engaging the under sides of the individual bricks at the forming means and raising them bodily straight up from their forming-support and similarly lowering them onto a receiving-support, substantially as described.

5. In an apparatus for the manufacture of bricks, means for forming successive single horizontal rows of bricks, lifting mechanism for separately raising and transporting said individual rows of bricks and depositing them side by side, said lifting mechanism engaging the single bricks and lifting and transporting them without bringing them into any abrasive contact or into contact with any other mechanism than the said lifting mechanism, and means for spacing said successive rows according to a predetermined arrangement, substantially as described.

6. In an apparatus for the manufacture of bricks, means for forming successive rows of bricks, mechanism for transporting said rows of bricks successively and depositing them adjacent each other so as to form a horizontal layer, and means for causing relative vertical movement of said layer of bricks and said transporting mechanism to enable the latter to deposit a layer of bricks on top of the preceding layer, substantially as described.

7. In an apparatus for the manufacture of bricks, means for forming successive rows of bricks, mechanism for transporting said rows of bricks successively and depositing them adjacent each other so as to form a horizontal layer, means for causing relative vertical movement of said layer of bricks and said transporting mechanism to enable the latter to deposit a layer of bricks on top of the preceding layer, and turning devices for bodily turning in a horizontal plane said layer of bricks to permit the succeeding layer to be laid crosswise thereof, substantially as described.

8. In an apparatus for the manufacture of bricks, means for supporting a plurality of bricks in position having engaging spaces beneath the bricks for a transporting device to enter and engage the bricks, and a transporting device to engage and carry said plurality of bricks, said transporting device comprising a track, a traveling frame to run on said track, a plurality of depending carrying-hooks supported by said frame and projecting forward horizontally at their lower ends to enter beneath and engage the bricks on said supporting means, means for raising and lowering said hooks relatively to said frames, and means for guiding said hooks rigidly so that they shall neither sway to and fro nor rotate relatively to said frames, substantially as described.

9. In an apparatus for the manufacture of bricks, means for supporting a plurality of bricks in position having engaging spaces beneath the bricks for a transporting device to enter and engage the bricks, and a transporting device to engage and carry said bricks, said transporting device comprising a track, a traveling frame to run on said track, a plurality of depending carrying-hooks projecting forward horizontally at their lower ends to engage a plurality of bricks, and means for preventing damage to the loaded bricks due to swaying or turning, said means including a rigid support in which said carrying-hooks are fastened, said support being guided vertically relatively to said frame, and means for raising and lowering said support and hooks in said frame, substantially as described.

10. In an apparatus for the manufacture of bricks, means for supporting a plurality of bricks in position having engaging spaces beneath the bricks for a transporting device to enter and engage the bricks, and a transporting device to engage and carry said bricks, said device having a plurality of depending hooks having projecting lower ends spaced apart for a plurality of said hooks to enter beneath and engage each brick for lifting said bricks, and a guide-plate to guide and support the bricks adjacent said hooks, substantially as described.

11. In an apparatus for the manufacture of bricks, a transporting device to engage and carry a plurality of bricks, a plurality of depending hooks having projecting lower ends spaced apart for a plurality of said hooks to engage each brick for lifting said bricks, a guide-plate to guide and support the bricks adjacent said hooks, and cutting devices, said guide-plate being apertured to permit the passage of said cutting devices, substantially as described.

12. In an apparatus for the manufacture of bricks, means for supporting a plurality of bricks, said supporting means leaving spaces beneath the bricks coinciding with the spaces between bricks when properly stacked for drying or burning, a transporting device for the bricks, said transporting device comprising a plurality of depending hooks having horizontally-extending lower ends adapted to enter the said spaces beneath the bricks to be transported, said hooks being rigidly connected together, and spaced apart at intervals coinciding with the spaces between the bricks when stacked in proper formation for drying or burning, whereby when said hooks deposit a plurality of bricks upon a previous layer of bricks at right angles thereto in stack formation, the hook will occupy the spaces between the individual bricks of said previous layer, substantially as described.

13. In an apparatus for the manufacture of bricks, a machine for forming a row of bricks, a bed or support having a series of transversely-extending supporting members for receiving said row of bricks, spaces between said supporting members at a plurality of intervals for each brick, combined with a carrying device having a plurality of horizontally-extending supporting-fingers spaced apart to enter the spaces between said supporting members, there being a plurality of said supporting-fingers for each brick, and means to raise said fingers into engagement with said bricks for lifting the latter from said bed, substantially as described.

14. In an apparatus for the manufacture of bricks, a track, a crane traveling thereon, a plurality of depending supporting fingers or hooks carried by said crane for simultaneously engaging and lifting a long series of bricks, a bed or support having means for supporting at intervals a series of bricks with intervening spaces in which said fingers or hooks may enter for engaging the bricks preparatory to lifting them, means for moving said crane on said track, and means for automatically stopping said crane at successively shorter and shorter intervals for the purpose of spacing the bricks apart when deposited by said hooks, said stopping means including a movable stop, and a pawl-and-ratchet mechanism operated by the movement of said crane for intermittently moving said stop, substantially as described.

15. In an apparatus for the manufacture of bricks, a track, a crane traveling thereon, a plurality of depending supporting fingers or hooks carried by said crane for simultaneously engaging and lifting a long series of bricks, means for moving said crane on said track, means for automatically stopping said crane at successively shorter and shorter intervals for the purpose of spacing the bricks apart when deposited by said hooks, said stopping means including a ratchet-bar movable relatively to said track, a stop carried by said ratchet-bar, a stationary pawl for engaging said ratchet-bar, a movable pawl also engaging said ratchet-bar, and yielding means carrying said movable pawl and engaged by said crane for intermittently moving said pawl and thereby shifting said ratchet-bar as desired, substantially as described.

16. In an apparatus for the manufacture of bricks, a support or platform on which successive rows of bricks may be stacked in successive layers, and means for lowering said support into successive positions to receive the successive layers for forming a stacked body of bricks in separated formation, substantially as described.

17. In an apparatus for the manufacture of bricks, a stacking device for transporting and stacking a plurality of bricks at a time, a support for receiving said bricks in successive layers of successive rows, and means for lowering said support into successive positions, substantially as described.

18. In an apparatus for the manufacture of bricks, a stacking device for transporting and stacking a plurality of bricks at a time, a support for receiving said bricks, means for lowering said support into successive positions, and means for rotating said support to enable the bricks to be placed crosswise of preceding bricks, substantially as described.

In testimony whereof I have signed my name to this specification in the presence of two subscribing witnesses.

JONATHAN P. B. FISKE.

Witnesses:
GEO. H. MAXWELL,
JOHN C. EDWARDS.